United States Patent [19]
Schulz

[11] 3,837,217
[45] Sept. 24, 1974

[54] MEASUREMENT OF POLYMER MOLECULAR WEIGHT DISTRIBUTION

[75] Inventor: Wolfgang W. Schulz, Warren, N.J.

[73] Assignee: Esso Research and Engineering Company, Linden, N.J.

[22] Filed: Oct. 19, 1972

[21] Appl. No.: 298,956

[52] U.S. Cl. ............... 73/61.1 C, 23/230 R, 73/53, 210/25
[51] Int. Cl. .......................................... G01n 31/08
[58] Field of Search ....... 73/61.1 C, 53, 28; 210/25, 210/31 R, 31 C; 23/230 R, 253 R

[56] References Cited
UNITED STATES PATENTS

| | | | |
|---|---|---|---|
| 3,561,253 | 2/1971 | Dorman | 73/28 |
| 3,649,200 | 3/1972 | Moore | 73/61.1 C X |
| 3,653,253 | 4/1972 | Olin | 73/28 |
| 3,683,678 | 8/1972 | Yau | 73/53 |

OTHER PUBLICATIONS
Timpa, J. D., et al. Viscometric Constants for Molecular Weight Determination of Cellulose Trinitrate in (THF), U.S. Dept. of Agriculture Pub., p. 2,099–2,103, Jan. 20, 1971.

Primary Examiner—Richard C. Queisser
Assistant Examiner—Joseph W. Roskos
Attorney, Agent, or Firm—Harold N. Wells

[57] ABSTRACT

For use with a gel permeation chromatograph measuring molecular weight distribution of polymeric materials, the combination of a piezoelectric crystal detector for measuring mass with an automatic viscometer for inferential measurement of molecular weight provides improved measurement of absolute molecular weight distribution of polymeric materials. Recycling of polymer fractions through the gel permeation chromatograph provides improved resolution of the individual fractions.

6 Claims, 2 Drawing Figures

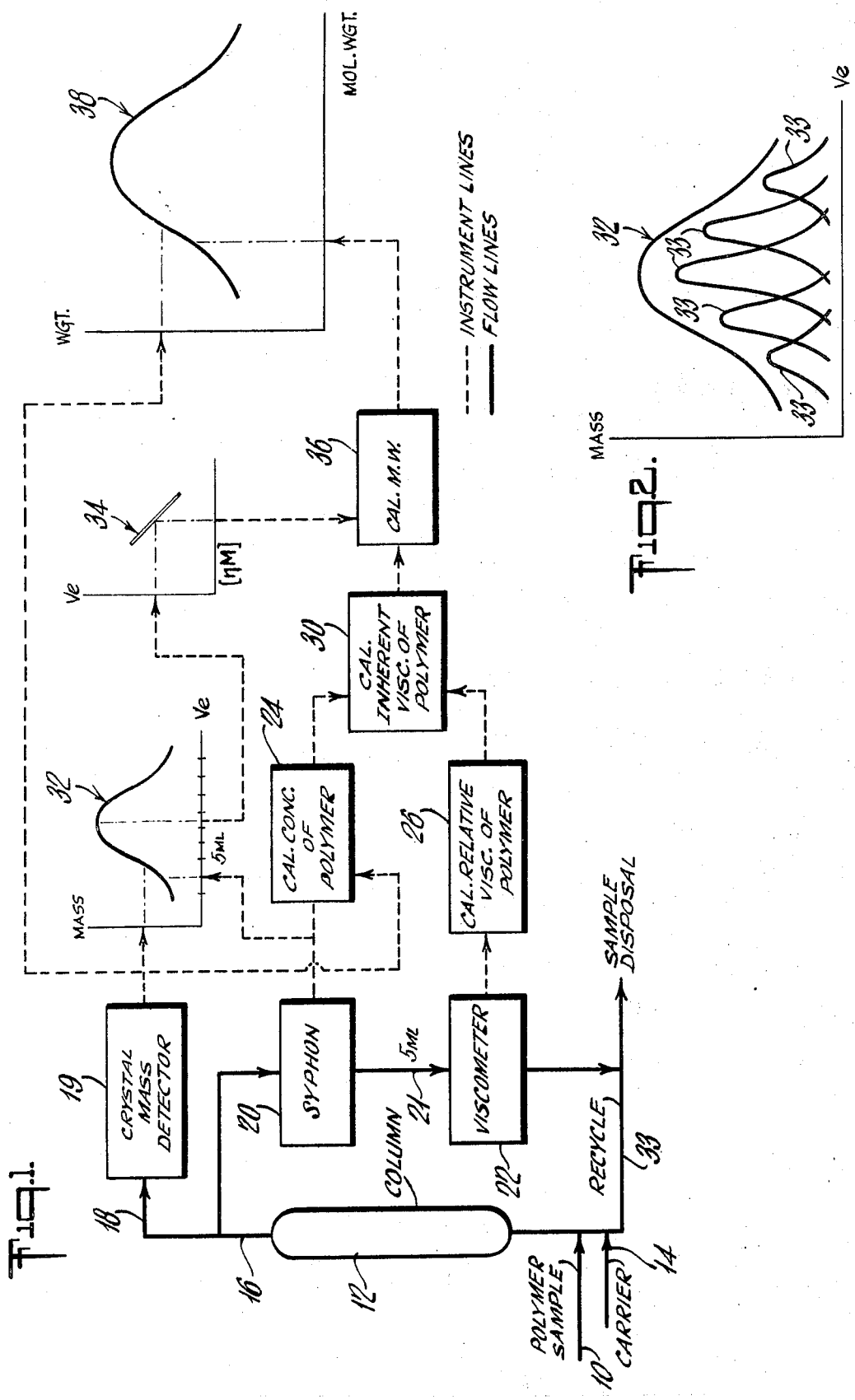

MEASUREMENT OF POLYMER MOLECULAR WEIGHT DISTRIBUTION

BACKGROUND OF THE INVENTION

Measurement of the molecular weight distribution of high molecular weight polymers is of particular interest because the physical properties of the polymers are related thereto. In recent years, a new technique known as gel permeation chromatography (GPC) has become prominent because of its ability to separate polymeric materials in dilute solution on the basis of molecular size. As suggested by the name, the technique, at least during its early stage of development, involved the use of a gel-type packing having pores of various sizes by means of which a mixture of polymer molecules may be separated depending on their size and shape. As with other liquid chromatographic techniques, when the packing is flushed by suitable solvent the pores give up the polymeric materials which they hold. This elution process occurs, beginning with the highest molecular weight polymer and continuing in sequence until all of the polymer has been removed, ending with the lowest molecular weight polymer present. By detecting the amount and the molecular weight of fractions of the effluent from the chromatograph, the molecular weight distribution of a polymer mixture may be obtained.

The technique most commonly used in the prior art for measuring the molecular weight distribution used two detectors, neither of which gives a direct measurement of the variables, molecular weight and quantity. A measurement of the quantity of polymer being eluted was made by using a differential refractometer and measurement of molecular weight was made by a volume counter. Using suitable correlations, these two measurements may be translated into mass of the effluent polymer and the molecular weight.

The measurement of molecular weight by counting the volume eluted can be done only by first obtaining information as to the molecular weight of the polymer leaving the packed column after a certain amount of solvent has passed through. By using polymer fractions of narrow and known molecular weight, it is possible to prepare a calibration curve which will permit the translation of volume of solvent effluent into molecular weight. Such measurements must be made for each type of polymer which is to be analyzed and for each chromatograph. Using this technique, for example, one would know that after 100 cc of solvent had left the column, material of 1 million molecular weight would be coming out. Such a procedure is complicated, time-consuming and is applicable in only the rare instances when standard polymers are available. Unknown polymers cannot be satisfactorily analyzed. However, such a technique may be useful when repetitive analyses are being made of known polymers.

Measurement of the quantity of polymer eluted with each volume of solvent is commonly made by means of a differential refractometer which determines the amount of polymer as related to the change of refractive index of the solvent resulting from the addition of polymer. Such instruments are widely used and extremely sensitive, but they do not measure mass directly. Instead, it is necessary to assume a linear proportionality between mass and refractive index and also that the polymer has a constant refractive index over a wide range of molecular weight and structure. The validity of these assumptions is restricted to homopolymers in the high molecular weight region. However, most polymers do not fit one or both of these assumptions and consequently, errors are introduced. A detector which measures polymer mass directly would be preferred.

A recent improvement in the measurement of molecular weight distribution is described in the Journal of Polymer Science, A-2, Vol. 8, page 1227 (1970). This improved technique is to add to the simple volume counter a viscosity measuring device and to obtain molecular weight therefrom. This technique is based on the finding that the hydrodynamic volume of a polymer is a means of correlating the elution behavior of most polymers. This being so, a single universal correlation curve may be developed from known polymers and thereafter applied to other polymers separated in the same column. Hydrodynamic volume has been related to the product of intrinsic viscosity and molecular weight so that by measuring intrinsic viscosity, molecular weight may be determined. Intrinsic viscosity is determined as the natural log of the ratio of the viscosity of the polymer solution to that of the solvent divided by the polymer concentration, extrapolated to zero concentration. The universal curve requires no prior knowledge of the polymer composition over a wide variety of polymers.

It is, in general, desirable to make a direct measurement of molecular weight distribution. This would minimize the calibration difficulties, make possible measurement of unknown polymers, give more accurate results, and finally, would permit correlation with other techniques of measuring molecular weight distribution. The present invention, which comprises a significant improvement over the prior art, makes possible a closer approach than has heretofore been possible to a direct measurement of molecular weight distribution.

SUMMARY OF THE INVENTION

Improved measurement of the molecular weight distribution of polymers is obtained by a novel detector package for a gel permeation chromatograph. A polymer which has been separated into fractions by size weight within a gel permeation chromatographic column is released by passing a solvent through the chromatographic column so that the polymer is removed in a sequence determined by molecular size. The eluted polymer solution is separated into fractions of equal volume. The viscosity of each fraction is measured and using the polymer concentration, its intrinsic viscosity is calculated. The universal correlation between molecular weight and intrinsic viscosity is applied to obtain molecular weights characterizing each fraction. The mass of the polymer corresponding to each fraction is measured directly by evaporating a sample of solution on a piezoelectric crystal and weighing the polymer residue by the change in vibrational frequency of the crystal. Combining the polymer mass of each fraction and the molecular weight yields the molecular weight distribution. Owing to the imprecise separation of the columns presently available, it is necessary to recycle the first fractions through the chromatograph in order to obtain improved resolution.

DETAILED DESCRIPTION

Brief Description of the Drawings

FIG. 1 illustrates schematically the process of the present invention including the measurements and subsequent calculational processes by which the molecular weight distribution of polymers is determined; and FIG. 2 is an enlarged view of a portion of FIG. 1, illustrating the improved resolution obtained by recycling the eluted polymer solution.

DESCRIPTION OF THE PREFERRED EMBODIMENT

A suitably diluted polymer sample is introduced via line 10 into the standard gel permeation chromatographic (GPC) column 12. The polymer molecules enter the pores in the column packing suitable for their respective molecular weights and shapes. The molecules are removed by a carrier solvent entering the column via line 14. The polymer is removed from the chromatographic substance in sequence according to the molecular weight, beginning with the highest molecular weight present. Thus, if one were able to measure directly the mass and the molecular weight of the polymer in each fraction of solution leaving the column, a curve could be prepared directly relating these two variables, thereby characterizing the polymer which was introduced as a mixture into the column. Direct measurement of molecular weight is not feasible. According to the present invention, a novel combination of detection and calculation techniques are used in order to accomplish this result. Upon leaving the column via line 16, a portion of the solution is periodically withdrawn for measurement of the mass of polymer in that sample by a piezoelectric crystal mass detector device 19 to be hereafter described in further detail. The output of this crystal mass detector 19 is used to directly determine the weight of the polymer in each fraction of solution. The output of the crystal mass detector is also used in combination with viscosity measurements to determine the molecular weight as will be described below.

The molecular weight of each polymer fraction is determined by means of the universal curve relating intrinsic viscosity and molecular weight to elution volume. Intrinsic viscosity is determined in order to utilize this universal curve. The intrinsic viscosity of a polymer may be defined as follows:

$$[\eta] = (\eta sp/c)_{c=0} = [(1n\eta_r)/c] \ c = 0$$

where:

$$= [(1n \ t/to)/c] \ c = o \quad (1)$$

$[\eta]$ = intrinsic viscosity
$\eta sp$ = specific viscosity = $\eta_r - 1 \cong (t-to)/to$
C = concentration
$(1n \ t/to)/c$ = inherent viscosity
$\eta_r$ = relative viscosity $\cong t/to$
$t$ = time for polymer solution to pass through viscometer
$to$ = time for solvent to pass through viscometer Thus, intrinsic viscosity may be determined by measuring the time for 5 ml of polymer solution to pass through the viscometer and the time of passage for an equal amount of solvent and extrapolating the result to zero polymer concentration.

In addition and of importance in the present invention, it is essential to make an accurate determination of the concentration of the polymer in each fraction of the eluate. For this purpose, both the volume measurements and the output of the crystal mass detector are combined. With the exception of the small valume withdrawn for the crystal mass detector 19 for which a small volume correction is made, the bulk of the sample eluting from the chromatographic column 12 passes to the syphon 20. The syphon 20 serves as a volume counter to determine the volume of each fraction of eluate. It forwards a fixed volume (5 ml.) to the automatic viscometer 22 which is downstream, where the viscosity is measured by the flow time required for each fraction to pass through a capillary tube. The viscometer used is similar to that described in the "Journal of Polymer Science," supra. Since the volume of each fraction is known, it is only required to measure the mass of each fraction by means of the crystal mass detector 19 to calculate the polymer concentration in computer 24.

The flow time for each 5 ml. fraction is determined by viscometer 22, which information is forwarded to the computer 26, wherein the ration of the flow time of the polymer solution and the flow time of pure solvent is calculated (relative viscosity, $\eta_r$). Computer 26, as with others discussed subsequently, may be any of the available devices whereby inputted data may be used to calculate output data related thereto by known mathematical relationship.

The output of computers 24 and 26 are combined in computer 30 to obtain the inherent viscosity. With the very dilute solutions which are commonly used in this technique, the inherent viscosity is an acceptably close approach to the extrapolation to zero polymer concentration which is required to calculate the intrinsic viscosity. Thus, inherent viscosity is used as equal to intrinsic viscosity.

Returning to crystal mass detector 19, it is shown that the mass determined by the crystal mass detector is correlated with the fraction volumes eluted in a curve 32 typical of that produced by prior art methods. The crystal mass detector samples approximately 10 portions of each 5 milliliter fraction. Such a curve 32 is insufficiently precise owing to the overlapping molecular weights produced by the chromatographic column 12. In order to successfully utilize the universal curve 34, a more precise definition of the volume corresponding to each eluted fraction is required. Thus, according to the invention, the polymer solution is recirculated after it leaves the viscometer 22 to the chromatographic column 12 via line 33 wherein the process is repeated, achieving a more precise separation. Information developed from the recycle polymer solution, FIG. 2, provides a sharper definition of the mass distribution within each fraction. The peak volume corresponding to each fraction may then be utilized with the universal curve 34 to determine the product of the intrinsic viscosity and molecular weight. It should be noted that the universal curve must be established for each column using standard polymer fractions before it may be applied to unknown polymers. The elution volumes relation to hydrodynamic volume is characteristic of each column, its dimensions and packing material.

The product of intrinsic viscosity and molecular weight from curve 34 is combined with the intrinsic viscosity determined within computer 30 in order to calculate in 36 the molecular weight corresponding to each 5 milliliter fraction of eluted polymer and solvent. The resulting molecular weight may then be combined with the weight corresponding to that fraction to prepare a molecular weight distribution curve corresponding to the polymer which has been analyzed. This typical curve is illustrated schematically as 38.

The specific embodiment which is disclosed herein should not be taken to limit the invention, the scope of which is defined by the claims which follow.

What is claimed is:

1. A method of determining the absolute molecular weight distribution of polymeric materials as they are eluted from a gel permeation chromatographic column by a solvent comprising the following steps:

a. dividing the eluted volume into uniform portions;

b. sampling each of said uniform portions at a plurality of uniformly spaced time intervals and measuring the mass of the polymer in each sample by,
      1. depositing each sample on the surface of a piezoelectric crystal;
      2. evaporating the solvent from each sample;
      3. measuring the mass of the polymer remaining after the solvent has been evaporated in step (2) by the change in the vibrating frequency of said crystal;

c. determining from (b) the relationship between mass and volume eluted for each of said portions of (a);

d. selecting as the elution volume representative of each portion the volume corresponding to the peak mass determined in (c) for said portion;

e. determining the concentration of said polymer in each of said portions by combining the mass of step (b) with the volume of step (a);

f. measuring the time for each of said portions to pass through a capillary viscometer;

g. determining the intrinsic viscosity of each of said portions as proportional to the ratio of the time of (f) to the time for an equal volume of pure solvent to pass through said viscometer;

h. determining from a previously measured universal correlation of elution volume versus the product of intrinsic viscosity and molecular weight the said product for each of said portions using the elution volume selected in (d);

i. determining the molecular weight of the polymer in each of said portions by dividing the product of step (h) by the intrinsic viscosity of step (g); and j. combining for each of said portions the molecular weight of step (i) with the mass of step (b) to obtain the molecular weight distribution of said polymer.

2. The method of claim 1 wherein each portion of eluted polymer leaving step (f) is recycled to the chromatographic column, thereby improving the separation of the polymer by molecular weight and improving the accuracy of step 1(d).

3. An apparatus for determining the molecular weight distribution of polymeric materials as they are eluted from a gel permeation chromatographic column by a solvent comprising:

a. a calibrated syphon for dividing said eluted polymer into uniform portions;

b. comparative viscometer means for measuring the viscosity of each of said portions passing through said viscometer and the viscosity of pure solvent;

c. mass measuring means for determining the mass of polymer contained in each of said portions and the concentration thereof; and d. means for calculating the molecular weight of the polymer in each of said portions using a universal curve of elution volume versus the product of intrinsic viscosity and molecular weight.

4. The apparatus of claim 3 further comprising means for calculating the molecular weight distribution of said polymer.

5. The apparatus of claim 3 further comprising means for recycling the uniform portions of (a) to the gel chromatographic column after the viscosity is measured by the viscometer means of (b).

6. The apparatus of claim 3 wherein said mass measuring means comprises a piezoelectric crystal whereby mass is determined by the change in vibrating frequency of said crystal after a sample has been placed thereon and the solvent evaporated therefrom.

* * * * *